Oct. 31, 1933.      A. LUDWIG      1,933,274

TESTING DEVICE

Filed March 30, 1932

INVENTOR
A. LUDWIG
BY
P. C. Smith
ATTORNEY

Patented Oct. 31, 1933

1,933,274

UNITED STATES PATENT OFFICE 1,933,274

TESTING DEVICE

Arthur Ludwig, New York, N. Y., assignor to Bell Telephone Laboratories, Incorporated, New York, N. Y., a corporation of New York Application March 30, 1932. Serial No. 602,094

2 Claims. (Cl. 175—183)

This invention relates to a testing device and more particularly to a direct reading device which is adapted for measuring the percentage closure of contacting devices used for the transmission of impulses and the like.

The object of the invention is to provide a testing device which is efficient and reliable wherein the percentage "make" period of the contacting device under test is readily indicated.

The general elements of my invention comprise a source of current supply, a variable resistance, an impedance circuit and a current meter. It is based upon the use of an impedance interposed between the source of current serially connected with the contacts to be tested, and an output receiving circuit comprising the current reading meter flexibly controlled through the aforesaid variable resistance for adjusting the current therethrough to what is required for its full scale deflection. The electrical constants of the impedance, which is essentially a low-pass filter, are so selected that the current delivered to the current meter from the impedance is a constant and average value of the current impulses delivered into the impedance by the impulsing contacts. If the current meter gives a deflection which is proportional to the current flowing through it then it follows that the deflection will be proportional to the average value of the current delivered into the impedance by the impulsing contacts. The current meter is provided with one hundred scale divisions or any multiple thereof and by using the aforesaid variable resistance the deflection of the current meter may be adjusted to full scale deflection when the operation of the contacts to be tested is stopped and the contacts are held closed. When the contacts are pulsing, the current meter will be deflected in proportion to the average value of current delivered into the impedance and the reading of the current meter, in divisions, will be equal to the percentage relation which the average current delivered to the impedance by the impulsing contacts bears to the total current delivered when the contacts are held steadily closed. As the average current bears the same percentage to the total current as the make period of the impulse bears to the total impulse (closed period + open period) the current meter reading in divisions will be equal to the per cent "make" of the impulses.

Figure 1:
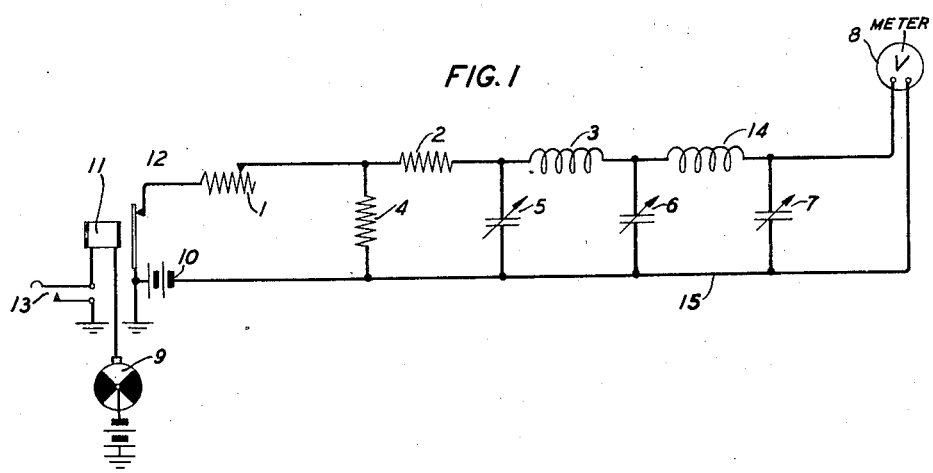
Figure 2:
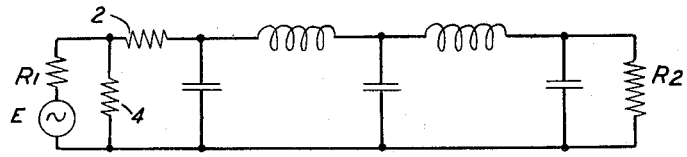
Figure 3:
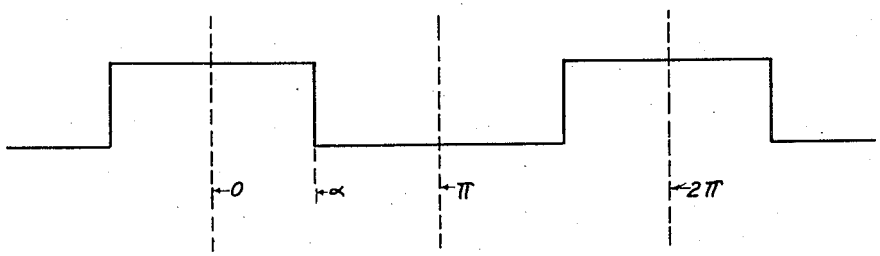

The mathematical explanation of the above relation may be considered with reference to the figures of the drawing in which Fig. 1 is a circuit diagram disclosing the arrangement of all the elements of the invention;

Fig. 2 represents the electrical equivalent, in conventional form, of the elements shown in Fig. 1 and;

Fig. 3 indicates the composite voltage wave through the entire circuit when the contacts are pulsing.

Considering Fig. 2 in which $R_1$ is the regulating resistance, $R_2$ the resistance of the current meter and E the interrupted source of current supply, it is evident that for small differences between resistances 2 and 4, compared to the battery potential supplied, the input impedance to the filter is the same as the terminating impedance. Hence there will be no reflected voltages which therefore may be disregarded.

The input voltage wave, controlled by the contacts to be tested, is of a square shape and is illustrated in Fig. 3. In the consideration of this voltage wave E=The maximum value of the voltage across the input side of the filter.

$\alpha$=Time between maximum and zero value of voltage E.

$\pi$=Time of ½ wave.

$2\pi$=Time of full wave.

This wave may then be represented as a function of time E(t), which may be extended into a Fourier series:

$$E(t) = A_0 + \sum_{n=1}^{n=\alpha} (a_n \sin npt + b_n \cos npt)$$

in which $A_0$ is the constant term and $a_n$ and $b_n$ the constant terms of the harmonics present.

In this case $A_0$ represents the direct current component of the wave and $$\sum_{n=1}^{n=\alpha} (a_m \sin npt + b_n \cos npt)$$

the alternating current terms, and since the meter, as a readable device, is of no use when the needle is vibrating in response to the unfiltered alternating current components of the input wave, only the case when the fundamental frequency $(n=1)$ is above the cut-off point of the filter is to be considered. This eliminates the alternating current terms and $E(t)_0 = A_0$.

Since the part played by the per cent "make" of the contacts under test is the only part of interest $A_0$ must be determined by integrating into two parts; namely from 0 to $\alpha$ and from $\alpha$ to $\pi$ thus covering all parts of the wave which are not repeated.

$$\int_0^\alpha E(t)dt + \int_\alpha^\pi E(t)dt = \int_0^\alpha A_0 dt + \int_\alpha^\pi A_0 dt$$

from which $$A_0 = \frac{1}{\pi}\left[\int_0^\alpha E(t)dt + \int_0^\pi E(t)dt\right]$$

During the interval 0 to $\alpha$ E(t) will be equal to E and during $\alpha$ to $\pi$ E(t) will equal 0, therefore, $$A_0 = \frac{1}{\pi}\left[E\alpha + 0\right]$$

(1) $\quad A_0 = E\frac{\alpha}{\pi}.$

On inspection of Fig. 3 it will be seen that $2\alpha/2\pi$ is the ratio of the "make" to the whole impulse and Equation (1) means that the voltage across the meter is directly proportional to "make" ratio or the per cent "make". Therefore, the reading of the current meter will be an exact "make" reading provided, of course, that the full scale coincides with the 100 per cent "make" by reason of the previous circuit adjustment and also provided that the speed of the impulse interruption is sufficiently high to prevent the meter needle from vibrating.

Consider now Fig. 1, in which is shown the circuit above analyzed wherein variable condensers 5, 6 and 7 together with inductances 3 and 14 form the impedance circuit of the impulse tester, 8 is the current meter, 2 and 4 equalizing resistances, 1 is the resistance for controlling the potential across the impedance, 10 a source of current, and 11 the relay having contacts 12 whose percentage "make" period in following the continuous impulses from interrupter 9 are to be measured.

Before any measurements can be made, meter 8 must be calibrated to a full scale division with respect to source of current 10. This is done by opening key 13 and establishing a steady state current over the following circuit path: ground, contacts 12, variable resistance 1, resistance 2, inductances 3 and 14, meter 8, conductor 15, to the negative pole of the battery 10. The quantity of current now flowing through this circuit will depend, of course, on the direct current resistance of the circuit and the strength of the battery should be such that with all the resistance 1 cut out of circuit, the meter 8 will read beyond its full scale calibration. Resistance 1 is then varied until the meter needle reads exactly its full scale indication thereby calibrating the meter and limiting the maximum quantity of current from battery 10 to what can be read on said meter.

The contacts 12 to be tested are now connected either directly or through a relay 11, as shown, to a source of impulses as 9. When key 13 is closed, an obvious impulsing circuit for relay 11 is closed causing the relay to operate and release in following the sequence of impulses from interrupter 9. As the contacts 12 make and break, the needle of meter 11 which ordinarily indicates current now reads a value which, if the full scale is 100, indicates the percentage "make" of the total impulse period as indicated by the above analysis.

Condensers 5, 6 and 7 are shown as variable in order to provide full flexibility for tuning with specific inductance values of coils 3 and 14. When a filter impedance comprising unknown inductances and variable condensers are arranged as shown, the tuning point for no reflex voltage should be determined by oscillographic studies or other similar means to make certain that all possibilities of reflex voltages are eliminated.

What is claimed is:

1. A direct reading device for testing the closed period of contacts adapted to transmit rhythmic impulses, comprising a source of current through said contacts, a measuring instrument, variable means for limiting the steady state current to the maximum required for full scale deflection of said instrument, and an impedance electrically interposed between said source of current and said instrument for averaging the current delivered by said impulsing contacts in the same proportionality to the full scale current as the make period of an impulse bears to the total period of said impulse.

2. The method of testing the percentage of the make periods of vibrating contacts to the entire impulse cycles which consists in calibrating a measuring instrument having one hundred scale divisions over an impedance circuit connected to a source of direct current so that on steady current from the source the instrument will indicate an exact full scale deflection and then intermittently opening and closing the impedance circuit by the vibrating contacts to be tested, the steady deflection of the instrument then indicating directly the percentage of the make periods to entire cycles of impulses transmitted by the contacts under test.

ARTHUR LUDWIG.